US011061675B2

(12) United States Patent
Derby et al.

(10) Patent No.: US 11,061,675 B2
(45) Date of Patent: *Jul. 13, 2021

(54) VECTOR CROSS-COMPARE COUNT AND SEQUENCE INSTRUCTIONS

(71) Applicant: INTERNATIONAL BUSINESS MACHINES CORPORATION, Armonk, NY (US)

(72) Inventors: Jeffrey H. Derby, Chapel Hill, NC (US); Robert K. Montoye, Yorktown Heights, NY (US); Dheeraj Sreedhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,505

(22) Filed: Oct. 25, 2019

(65) Prior Publication Data
US 2020/0057637 A1 Feb. 20, 2020

Related U.S. Application Data

(63) Continuation of application No. 15/244,570, filed on Aug. 23, 2016, now Pat. No. 10,564,964.

(51) Int. Cl.
*G06F 9/30* (2018.01)
(52) U.S. Cl.
CPC ...... *G06F 9/30021* (2013.01); *G06F 9/30036* (2013.01)

(58) Field of Classification Search
CPC .................................................. G06F 9/30036
See application file for complete search history.

(56) References Cited

U.S. PATENT DOCUMENTS

| 8,069,334 B2 | 11/2011 | Mimar |
| 2013/0185539 A1 | 7/2013 | Hung et al. |
| 2014/0068226 A1 | 3/2014 | Smelyanskiy et al. |
| 2015/0067008 A1 | 3/2015 | Kamath et al. |

OTHER PUBLICATIONS

List of IBM Patents or Patent Applications Treated as Related dated Oct. 25, 2019, 2 pages.

(Continued)

*Primary Examiner* — Jacob Petranek
(74) *Attorney, Agent, or Firm* — Tutunjian & Bitetto, P.C.; Vazken Alexanian

(57) ABSTRACT

Systems and methods are provided for executing an instruction. The method may include loading a first vector into a first location, the first vector including a plurality of first data elements and loading a second vector into a second location, the second vector including a plurality of second data elements. The method may further include comparing the plurality of first data elements of the first vector to the plurality of data elements of the second vector and performing one or more operations on the plurality of first and second data elements based on at least one vector cross-compare instruction. The one or more operations include counting a number of data elements of the plurality of first and second data elements that satisfy at least one condition, counting a number of times specified values occur in the plurality of first and second data elements, and generating sequence counts for duplicated values.

20 Claims, 12 Drawing Sheets

(56) References Cited

OTHER PUBLICATIONS

Shahbahrami, et al., "SIMD Vectorization of Histogram Functions", Application-specific Systems, Architectures and Processors. IEEE International Conf. on IEEE. 2007. pp. 174-179.
Gan, et al., "Parallel array histogram architecture for embedded implementations", Electronics Letters. Jan. 17, 2013. vol. 49; No. 2. pp. 1-2.
Lee, et al., "Debunking the 100X GPU vs. CPU Myth: An Evaluation of Throughput Computing on CPU and GPU", ACM SIGARCH Computer Architecture News. vol. 38; No. 3. ACM, 2010. pp. 451-460.
Auguin, et al., "Image Processing on a SIMD/SPMD Architecture: OPSILA", Pattern Recognition. 9th International Conference on IEEE. 1988. pp. 430-433.
Ahn, et al., "Scatter-Add in Data Parallel Architectures", IEEE Computer Society. Proceedings of the 11th Int'l Symposium on High-Performance Computer Architecture (HPCA-11 2015). pp. 1-11.
Hayes, et al., "VSR Sort: A Novel Vectorised Sorting Algorithm & Architecture Extensions for Future Microporcessors", Barcelona Supercomputing Center. Universitat Politencia de Catulunya. Consejo Superior de Investigacions Cientificas (IIIA-CSIC). Feb. 2015. pp. 1-13.
STTNI Instructions in SSE4.2; https://software.intel.com/en-usfforums/accelerate-contest-english-forum/topic/278534, accessed on Jun. 8, 2016. pp. 1-4.

|   |   | Assume VSR[0] has input 774 454 774 869 454 996 774 869 (assume 10 bits for clarity) |
|---|---|---|
| 1 | vxcmpcntw 4,0,0 | VSR[4] contains 3 2 3 2 2 1 3 2 |
| 2 | vslw 2,0,11 | VSR[2] contains byte address of histogram on the reg file (multiply by 32) |
| 3 | mtmr 17,2 | MR 17 contains the pointers to histogram locations (offsets) |
| 4 | incrmrh 17, 20, 2 | Increment MR 17 to point to the start of the histogram |
| 5 | vgetw 5, 17 | VSR[5] is now Histogram values for the current input |
| 6 | vaddsws 6, 5, 4 | VSR[6] is now the updated histogram (VSR[4] is computed in line 2) (Note that the same histogram bins could be updated multiple times in this, but does not matter) |
| 7 | vputw 17, 6, 1-8 | Scatter VSR[6] to MR 17; (again, same location could be updated multiple times, but does not matter as long as any one of them successfully writes) |
|   |   |   |
|   |   |   |

FIG. 10

|   |   |   |
|---|---|---|
|   |   | Assume VSR[0] has input 774 454 909 869 665 996 884 484 (assume 10 bits for clarity) |
| 1 | vsrw 2,0,9 | A bit shift by 7 (contents of VSR[9]) gives the bucket indices. VSR[2] is 6 3 7 6 5 7 6 3 (VSR[2] contains the indices of each bucket, i.e. 774 (first element) goes to bucket 6) |
| 2 | Vxcmpseq 3,2 | VSR[3] contains 0 0 0 1 0 1 2 1 |
| 3 | vslw 3,3,10 | VSR[3] contains 0 0 0 32 0 32 64 32; left shift each element by 32 (this is the offset) |
| 4 | vslw 2,2,11 | VSR[2] contains 24 12 28 24 20 28 24 12; left shift each element by 4 (byte offset of the bucket) |
| 5 | vaddsws 6, 2, 3 | VSR[6] contains 24 12 28 56 20 60 88 44 (now VSR[6] contains the byte addresses of each input) |
| 6 | mtmr 17,6 | MR 17 contains the pointer offset to scatter the input |
| 7 | incrmrh 17, 20, 1 | Increment MR 17 to point to where you want to start the buckets (K) |
| 8 | vputw 17, 0, 1-8 | Scatter VSR[0] to MR 17; say starting from VSR[10] (K). At the end of 8 instructions, VSR[10] is 0 0 0 454 0 665 774 909 VSR[11] is 0 0 0 484 0 0 869 996 VSR[12] is 0 0 0 0 0 0 884 0 |
|   |   |   |

FIG. 11

VECTOR CROSS-COMPARE COUNT AND SEQUENCE INSTRUCTIONS

BACKGROUND

Technical Field

The invention relates generally to data processing in a computing environment, and more specifically, to mechanisms for implementing vector processing within such computing environment.

Description of the Related Art

Processing within a computing environment includes controlling operation of one or more central processing units (CPUs). Normally, operation of a CPU is controlled by instructions in storage. Instructions may have different formats and often specify registers to be used in performing various operations.

Depending on the architecture of the CPU, various types of registers may be used including, for instance, general purpose registers, special purpose registers, floating point registers and/or vector registers, as examples. Different types of registers may be used with different types of instructions. For instance, floating point registers store floating point numbers to be used by floating point instructions and vector registers hold data for vector processing performed by Single Instruction, Multiple Data (SIMD) instructions, including vector instructions.

SUMMARY

In accordance with an embodiment of the present principles, a computer-implemented method is provided for executing a SIMD instruction. The computer-implemented method includes the steps of loading a first vector into a first location, the first vector including a plurality of first data elements and loading a second vector into a second location, the second vector including a plurality of second data elements. The computer-implemented method further includes the steps of comparing the plurality of first data elements of the first vector to the plurality of second data elements of the second vector, and performing one or more operations on the plurality of first and second data elements by applying vector cross-compare instructions processed by partitioning the vector cross-compare instructions into comparison, selection, and reduction steps.

In accordance with another embodiment of the present principles, a system for executing a SIMD instruction is provided. The system includes a memory and a processor in communications with the memory, wherein the computer system is configured to perform the steps of loading a first vector into a first location, the first vector including a plurality of first data elements, loading a second vector into a second location, the second vector including a plurality of second data elements, comparing the plurality of first data elements of the first vector to the plurality of second data elements of the second vector, and performing one or more operations on the plurality of first and second data elements by applying vector cross-compare instructions processed by partitioning the vector cross-compare instructions into comparison, selection, and reduction steps.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 10 depicts example code for vectorizing histogram computations using vector cross-compare instructions, in accordance with an embodiment of the present principles;

FIG. 11 depicts example code for vectorizing bucket hashing computations using vector cross-compare instructions, in accordance with an embodiment of the present principles;

Throughout the drawings, same or similar reference numerals represent the same or similar elements.

DETAILED DESCRIPTION

In accordance with one or more aspects, a vector facility is provided that includes various vector instructions, such as vector cross-compare and count instructions and vector cross-compare and sequence instructions. Each of the cross-compare instructions described is a Single Instruction, Multiple Data (SIMD) instruction that uses one or more vector registers (also referred to as vectors). A vector register is, for instance, a processor register (also referred to as a hardware register), which is a small amount of storage (e.g., not main memory) available as part of a central processing unit (CPU) or other processor. Each vector register contains a vector operand having one or more elements, and an element is, for example, one, two, four or eight bytes in length. In other embodiments, elements may be of other sizes.

In accordance with one or more aspects, techniques are provided for performing multiple database operations using, for example, vectorized instructions. Such instructions are also referred to as SIMD instructions. The database operations include at least counting the number of data elements in a vector that satisfy a given condition, counting the number of times specified values occur in a vector, and generating sequence counts for sets of duplicated values in a vector. The database operations are implemented or executed by at least vector cross-compare and count instructions, vector cross-compare and sequence instructions, and vector cross-compare and equal instructions. The vector cross-compare instructions may be used, for example, to accelerate at least histogram computations and bucket hashing computations.

In accordance with one or more aspects, the vector instructions are implemented with, for example, SIMD having fixed-size vectors with subword parallelism.

It is to be understood that the present invention will be described in terms of a given illustrative architecture; however, other architectures, structures, and process features and blocks/steps may be varied within the scope of the present invention. It should be noted that certain features may not be shown in all figures for the sake of clarity. This is not intended to be interpreted as a limitation of any particular embodiment, or illustration, or scope of the claims.

Figure 1:
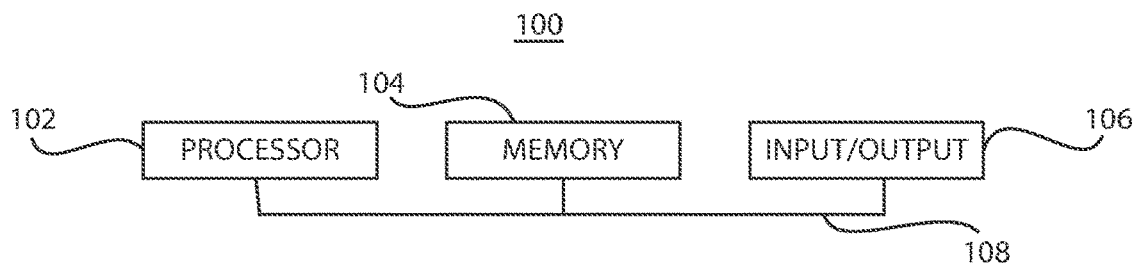
FIG. 1 is a block/flow diagram of an exemplary computing environment, in accordance with an embodiment of the present principles.

Referring now to the drawings in which like numerals represent the same or similar elements and initially to FIG. 1, a block/flow diagram of an exemplary computing environment is presented, in accordance with an embodiment of the present principles.

The computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

Figure 2:
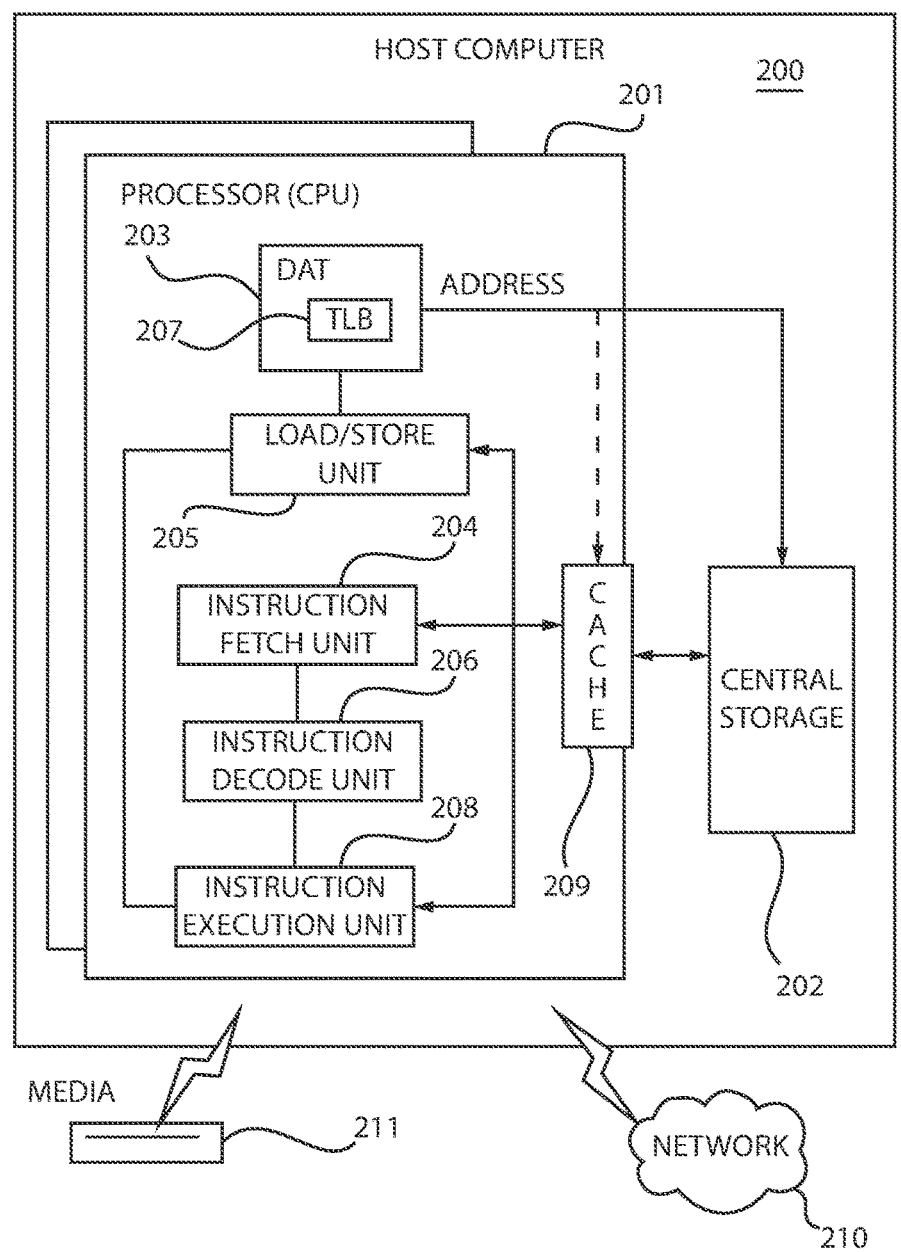
FIG. 2 is a block/flow diagram of another exemplary computing environment, in accordance with an embodiment of the present principles.

FIG. 2 is a block/flow diagram of another exemplary computing environment, in accordance with an embodiment of the present principles.

Representative components of a host computer system 200 to implement one or more aspects are portrayed. The representative host computer 200 comprises one or more CPUs 201 in communication with computer memory (i.e., central storage) 202, as well as I/O interfaces to storage media devices 211 and networks 210 for communicating with other computers. The CPU 201 is compliant with an architecture having an architected instruction set and architected functionality. The CPU 201 may have dynamic address translation (DAT) 203 for transforming program addresses (virtual addresses) into real addresses of memory. A DAT includes a translation lookaside buffer (TLB) 207 for caching translations so that later accesses to the block of computer memory 202 do not require the delay of address translation. A cache 209 is usually employed between computer memory 202 and the CPU 201. The cache 209 may be hierarchical having a large cache available to more than one CPU 201 and smaller, faster (lower level) caches between the large cache and each CPU 201.

In one or more embodiments, the lower level caches are split to provide separate low level caches for instruction fetching and data accesses. In one aspect, an instruction, such as a vector cross-compare instruction, is fetched from memory 202 by an instruction fetch unit 204 via the cache 209. The vector cross-compare instruction is decoded in an instruction decode unit 206 and dispatched (with other cross-compare or non-cross-compare instructions in some embodiments) to instruction execution unit or units 208. Several execution units 208 are employed, for example an arithmetic execution unit, a floating point execution unit and a branch instruction execution unit. The vector cross-compare instruction is executed by the execution unit, accessing operands from instruction specified registers or memory as needed. If an operand is to be accessed (loaded or stored) from memory 202, a load/store unit 205 handles the access under control of the vector cross-compare instruction being executed. Vector cross-compare instructions may be executed, for example, in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they may be processed.

Main storage may include one or more smaller, faster-access buffer storages, sometimes called caches. A cache is physically associated with a CPU or an I/O processor. The effects, except on performance, of the physical construction and use of distinct storage media are generally not observable by the program.

However, separate caches may be maintained for vector cross-compare instructions and for data operands. Information within a cache is maintained in contiguous bytes on an integral boundary called a cache block or cache line (or line, for short). A model may provide a vector cross-compare and count instruction which, for example, counts a number of times specified values occur in a plurality of first and second data elements of first and second vectors. A model may also provide a vector cross-compare and sequence instruction which, for example, generates sequence counts for duplicated values identified in the plurality of first and second data elements.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left proceeding in a left-to-right sequence. Addresses are unsigned binary integers and are 24, 31, or 64 bits. The vector cross-compare instructions may have three forms, that is, fullword (32 bit), halfword (16 bit), and byte (8 bit). Half a byte (four bits) is called a nibble. In some systems, the term octet is used for an eight-bit unit instead of byte. In many systems, four eight-bit bytes or octets form a 32-bit word. In such systems, instruction lengths are sometimes expressed as full-word (32 bits in length) or half-word (16 bits in length).

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses.

Within any other fixed-length format of multiple bytes, the bits making up the format are consecutively numbered starting from 0. For purposes of error detection, and usually for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which may be one, two, four, eight, or sixteen bytes. Larger fields may be implied for some instructions, such as cross-compare instructions. When the length of a storage-operand field is not implied but is stated explicitly, the field is said to have a variable length. Variable-length operands may vary in length by increments of one byte (or with some cross-compare instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions, such as cross-compare instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

Referring back to FIG. 2, software program code which embodies one or more aspects may be accessed by CPU 201 of the host system 200 from long-term storage media devices 211, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 202 or storage of one computer system over a network 210 to other computer systems for use by users of such other systems.

The software program code includes an operating system which controls the function and interaction of the various computer components and one or more application programs. Program code is normally paged from storage media device 211 to the relatively higher-speed computer storage 202 where it is available for processing by CPU 201. The techniques and methods for embodying software program code in memory, on physical media, and/or distributing software code via networks are well known.

Figure 3:
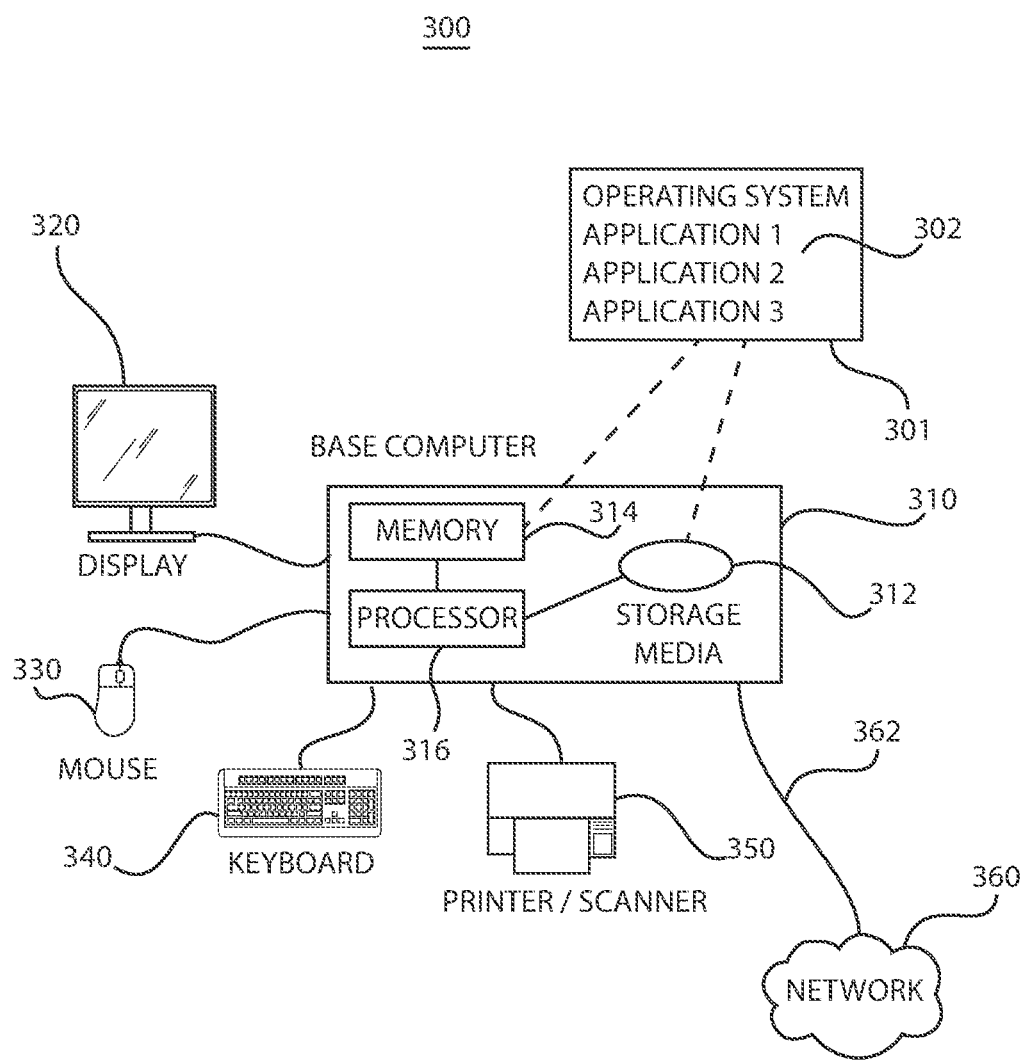
FIG. 3 is a block/flow diagram of yet another exemplary computing system, in accordance with an embodiment of the present principles.

FIG. 3 is a block/flow diagram of yet another exemplary computing system, in accordance with an embodiment of the present principles.

A representative workstation or server hardware system is depicted. The system 300 includes a representative base computer system 310, such as a personal computer, a workstation or a server, including optional peripheral devices. The base computer system 310 includes one or more processors 316 and a bus employed to connect and enable communication between the processor(s) 316 and the other components of the system 300 in accordance with known techniques. The base computer system 310 may run on an operation system 301 including a plurality of applications 302.

The bus connects the processor 316 to memory 314 and long-term storage 312 which may include a hard drive (including any of magnetic media, CD, DVD and Flash Memory for example) or a tape drive for example. The system 300 might also include a user interface adapter, which connects the microprocessor 316 via the bus to one or more interface devices, such as a keyboard 340, a mouse 330, a printer/scanner 350 and/or other interface devices, which may be any user interface device, such as a touch sensitive screen, digitized entry pad, etc. The bus also connects a display device 320, such as an LCD screen or monitor, to the microprocessor 316 via a display adapter.

The system 300 may communicate with other computers or networks of computers by way of a network adapter 362 capable of communicating with a network 360. Example network adapters are communications channels, token ring, Ethernet or modems. Alternatively, the system 300 may communicate using a wireless interface, such as a CDPD (cellular digital packet data) card. The system 300 may be associated with other computers in a Local Area Network (LAN) or a Wide Area Network (WAN), or the system 300 may be a client in a client/server arrangement with another computer.

Figure 4:
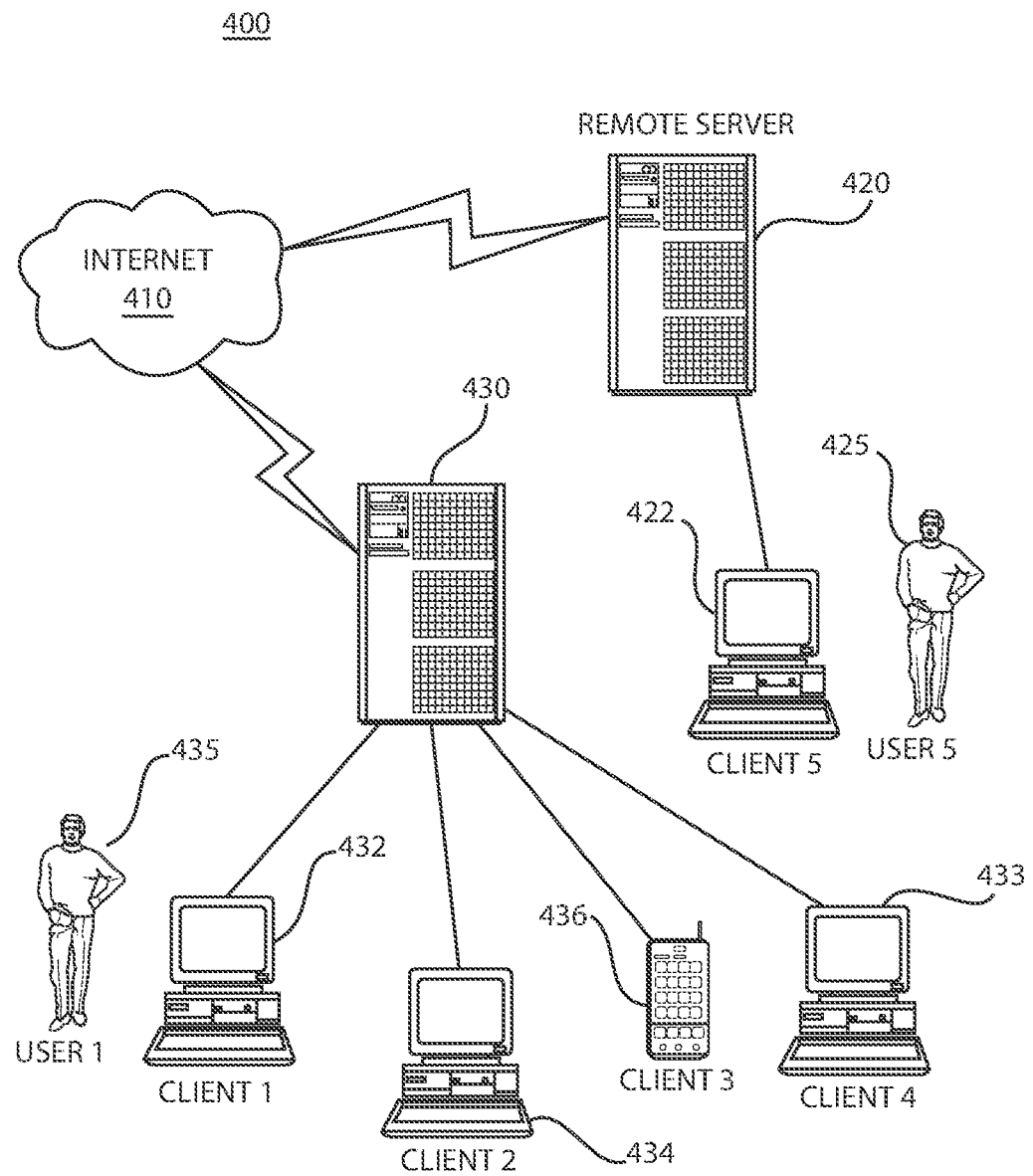
FIG. 4 is a block/flow diagram of a computing system including a computer network, in accordance with an embodiment of the present principles.

FIG. 4 is a block/flow diagram of a computing system including a computer network, in accordance with an embodiment of the present principles.

The data processing network 400 may include a plurality of individual networks, such as a wireless network and a wired network, each of which may include a plurality of individual workstations 422, 432, 433, 434 and client 436 (e.g., a mobile device). Additionally, as those skilled in the art will appreciate, one or more LANs may be included, where a LAN may comprise a plurality of intelligent workstations coupled to a host processor.

The networks may also include mainframe computers or servers, such as a gateway computer (client server 430) or application server (remote server 420 which may access a data repository and may also be accessed directly from a workstation 422). A gateway computer 430 serves as a point of entry into each individual network. A gateway is needed when connecting one networking protocol to another. The gateway 430 may be coupled to another network (e.g., the Internet 410) by a communications link. The gateway 430 may also be directly coupled to one or more workstations 422, 432, 433, 434 or client 436 by using a communications link. The gateway computer may be implemented utilizing an IBM eServer™ System z server available from International Business Machines Corporation.

Referring concurrently to FIGS. 3 and 4, software programming code may be accessed by the processor 316 of the system 300 from long-term storage media 312, such as a CD-ROM drive or hard drive. The software programming code may be embodied on any of a variety of known media for use with a data processing system, such as a diskette, hard drive, or CD-ROM. The code may be distributed on such media 312, or may be distributed to users 425, 435 (FIG. 4) from the memory or storage of one computer system over a network to other computer systems for use by users of such other systems.

Alternatively, the programming code may be embodied in the memory 314, and accessed by the processor 316 using the processor bus. Such programming code includes an operating system 301 which controls the function and interaction of the various computer components and one or more application programs 302. Program code is normally paged from storage media 312 to high-speed memory 314 where it is available for processing by the processor 316. The techniques and methods for embodying software programming code in memory, on physical media, and/or distributing software code via networks are well known.

Additionally, the cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 5:
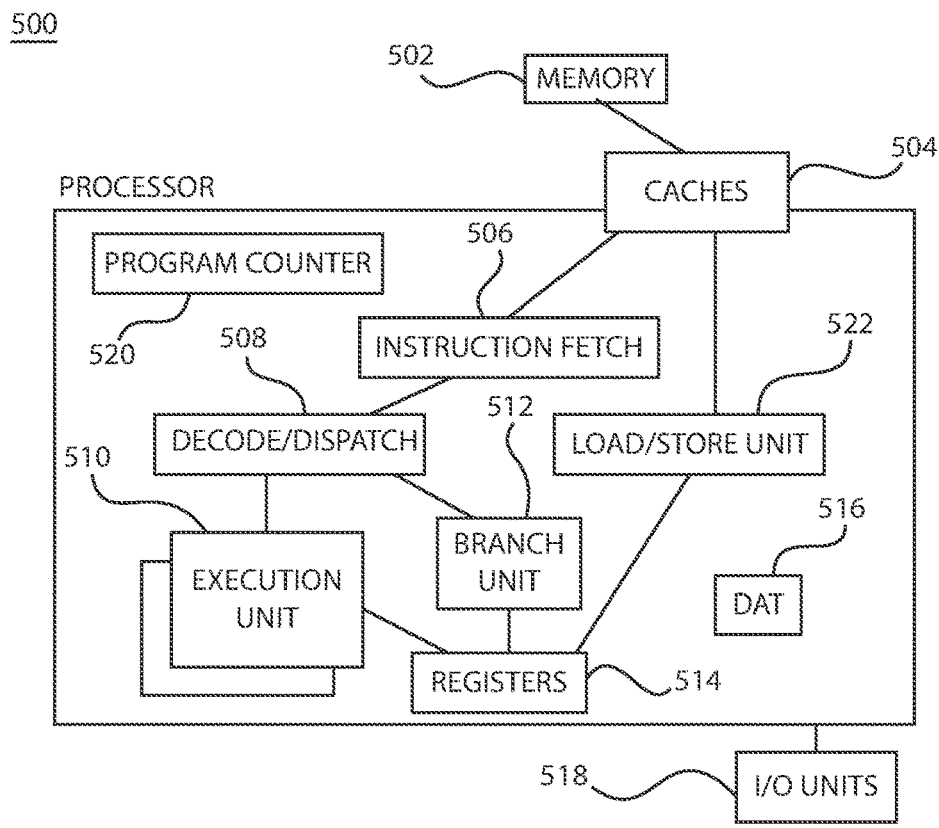
FIG. 5 is a block/flow diagram of various elements of a computer system implementing cross-compare instructions, in accordance with an embodiment of the present principles.

FIG. 5 is a block/flow diagram of various elements of a computer system implementing cross-compare instructions, in accordance with an embodiment of the present principles.

An exemplary processor embodiment is depicted for processor 500. One or more levels of cache 504 are employed to buffer memory blocks in order to improve processor performance. The cache 504 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms. Main memory storage 502 of a processor system is often referred to as a cache. In a processor system having 4 levels of cache 504, main storage 502 is sometimes referred to as the level 5 (L5) cache since it is faster and only holds a portion of the non-volatile storage (DASD, tape, etc.) that is available to a computer system. Main storage 502 "caches" pages of data paged in and out of the main storage 502 by the operating system.

A program counter 520 keeps track of the address of the current instruction to be executed (e.g., vector cross-compare and count instruction, vector cross-compare and sequence instruction, vector cross-compare and equal instruction, as well as non-vector cross-compare instructions). A program counter in a z/Architecture processor is 64 bits and may be truncated to 31 or 24 bits to support prior addressing limits. The program counter 520 may be embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. The program counter 520 may be incremented by an amount equal to the number of bytes of the current instruction. RISC (Reduced Instruction Set Computing) instructions are fixed length while CISC (Complex Instruction Set Computing) instructions are variable length. Instructions of the IBM z/Architecture are CISC instructions having a length of, for example, 2, 4 or 6 bytes.

The program counter 520 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 520.

A vector cross-compare instruction fetch unit 506 is employed to fetch instructions on behalf of the processor 500. The vector cross-compare fetch unit 506 either fetches "next sequential instructions," target instructions of branch taken instructions, or first instructions of a program following a context switch. Instruction fetch unit 506 employs pre-fetch techniques to speculatively pre-fetch instructions based on the likelihood that the pre-fetched instructions might be used. For example, the vector cross-compare fetch unit 506 may fetch 16 bytes of a vector cross-compare instruction that includes the next sequential instruction and additional bytes of further sequential instructions.

The CPU 500 may also have dynamic address translation (DAT) 516 for transforming program addresses (virtual addresses) into real addresses of memory. Input/Output or I/O devices 518 (including, but not limited to, keyboards, displays, pointing devices, DASD, tape, CDs, DVDs, thumb drives and other memory media, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the available types of network adapters.

The fetched vector cross-compare instructions are then executed by the processor 500. In an embodiment, the fetched vector cross-compare instruction(s) are passed to a dispatch unit 508 of the vector cross-compare fetch unit 506. The dispatch unit 508 decodes the vector cross-compare instruction(s) and forwards information about the decoded instruction(s) to appropriate units 510, 512, 522. One or more of the execution units 510 receive information regarding, e.g., decoded arithmetic instructions from the instruction fetch unit 506 and perform arithmetic operations on operands according to the opcode of the instructions. Operands are provided to one or more of the execution units 510 either from memory 502, architected registers 514 or from an immediate field of the instructions being executed. Results of the execution, when stored, are stored either in memory 502, registers 514 or in other machine hardware (such as control registers, PSW registers and the like).

In one example, the plurality of execution units 510 include a scalar fixed-point execution unit, a scalar floating-point execution unit, and a SIMD vector cross-compare execution unit. The dispatch unit 508 may send decoded instructions to the appropriate execution unit of the plurality of execution units 510. Moreover, the SIMD vector cross-compare execution unit may itself include a set of execution units, those being, e.g., a vector fixed-point arithmetic execution unit, a vector floating-point arithmetic execution unit, and many more execution units contemplated by one skilled in the art. The vector cross-compare execution units of the present embodiments support a number of vector cross-compare instruction types and subword parallelism (i.e., different numbers of data elements per vector).

Figure 6:
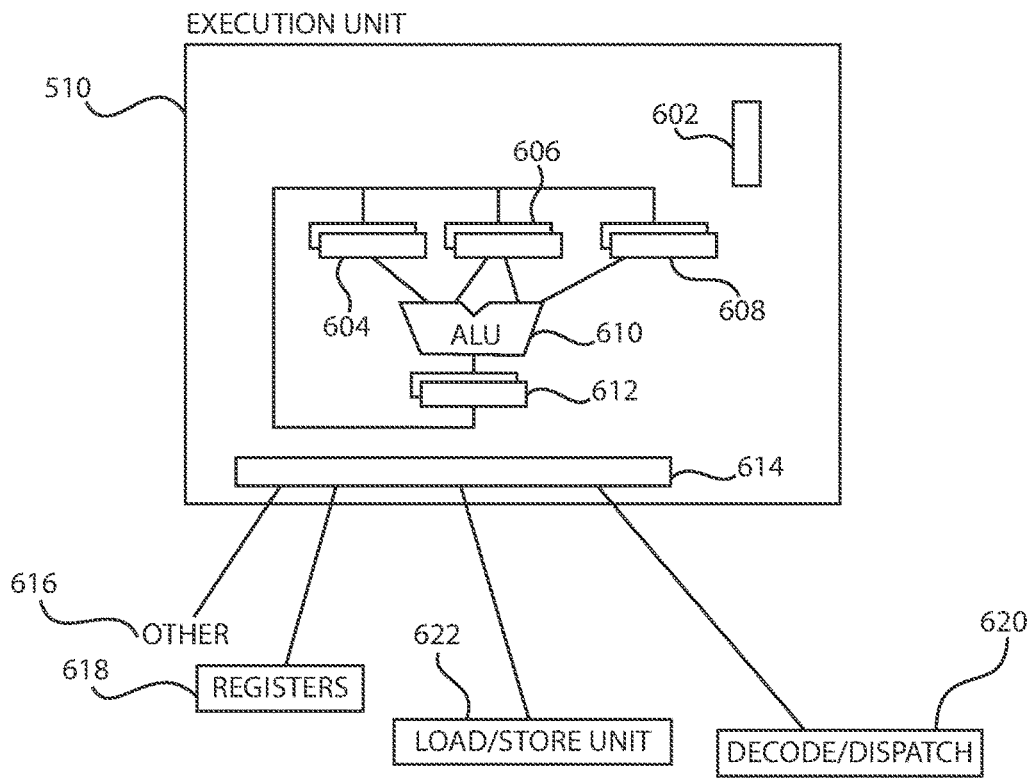
FIG. 6 is a block/flow diagram of one embodiment of an execution unit of the computer system of FIG. 5 for executing vector cross-compare instructions, in accordance with an embodiment of the present principles.

FIG. 6 depicts one embodiment of an execution unit of the computer system of FIG. 5 for executing vector cross-compare instructions, in accordance with an embodiment of the present principles.

The vector-cross compare execution unit of the execution units 510 may communicate with architected general registers 618, a decode/dispatch unit 620, a load store unit 622, and other 616 processor units by way of interfacing logic 614. The vector cross-compare execution unit of the execution units 510 may employ several register circuits 604, 606, 608, 612 to hold information that the arithmetic logic unit (ALU) 610 operates on. The ALU 610 performs arithmetic operations such as add, subtract, multiply and divide, as well as logical function, such as AND, OR, and exclusive-or (XOR), rotate and shift. The ALU 610 supports specialized operations that are design dependent. Other circuits may provide other architected facilities 602 including condition codes and recovery support logic for example.

An ADD instruction, for example, would be executed in the vector cross-compare execution unit of the execution units 510 having arithmetic and logical functionality while a floating point instruction, for example, would be executed in a floating point execution having specialized floating point capability. The vector cross-compare execution unit of the execution units 510 operates on operands identified by an instruction by performing an opcode defined function on the operands. For example, an ADD instruction may be executed by the vector cross-compare execution unit of the execution units 510 on operands found in two registers 618 identified by register fields of a vector cross-compare instruction, such as a vector cross-compare and count instruction or a vector cross-compare and sequence instruction or a vector cross-compare and equal instruction.

One or more of the execution units 510 perform, for example, the arithmetic addition on two operands and store the result in a third operand where the third operand may be a third register or one of the two source registers. One or more of the execution units 510 may utilize the ALU 610 that is capable of performing a variety of logical functions, such as Shift, Rotate, AND, OR and XOR, as well as a variety of algebraic functions including any of add, subtract, multiply, divide. One skilled in the art may contemplate using any type of logical functions to implement a variety of different cross-compare instructions, such as, but not limited to, a vector cross-compare and count instruction or a vector cross-compare and sequence instruction or a vector cross-compare and equal instruction.

Some ALUs 610 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU 610 does not need to design a subtract capability since either a negative value or a positive value in 2's complement requires only an addition within the ALU 610. Numbers are commonly described in shorthand, where a 12 bit field defines an address of a 4,096 byte block and is commonly described as a 4 Kbyte (Kilo-byte) block, for example.

Figure 7:
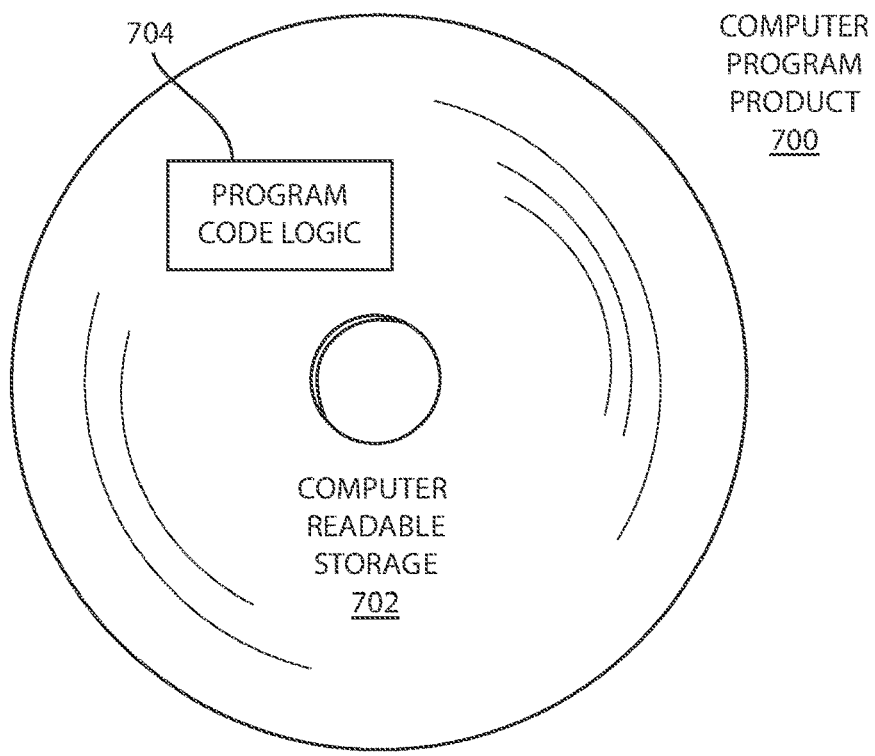
FIG. 7 depicts one embodiment of a computer program product, in accordance with an embodiment of the present principles.

FIG. 7 depicts one embodiment of a computer program product, in accordance with an embodiment of the present principles In one example, a computer program product 700 includes, for instance, one or more non-transitory computer readable storage media 702 to store computer readable program code logic 704 thereon to provide and facilitate one or more aspects of the present principles. Program code embodied on a computer readable medium may be transmitted using an appropriate medium, including but not limited to, wireless, wireline, optical fiber cable, RF, etc., or any suitable combination of the foregoing.

In one aspect, a computing infrastructure may be deployed comprising integrating computer readable code into a computing system, in which the code in combination with the computing system is capable of performing one or more aspects.

In another aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Regarding FIGS. 1-7, in one or more exemplary embodiments, the instructions described herein are vector instructions, which are part of a vector facility. The vector facility provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur until processing of all the elements is complete. In other embodiments, the elements are processed partially in parallel and/or sequentially.

Vector instructions may be implemented as part of various architectures, including, but not limited to, the z/Architecture, Power, x86, IA-32, IA-64, etc. Although embodiments described herein are for the z/Architecture, the vector instructions described herein and one or more other aspects may be based on many other architectures. The z/Architecture is only one example.

In one embodiment in which the vector facility is implemented as part of the z/Architecture, to use the vector registers and instructions, a vector enablement control and a register control in a specified control register (e.g., control register 0) are set to, for instance, one. If the vector facility is installed and a vector instruction is executed without the enablement controls set, a data exception is recognized. If the vector facility is not installed and a vector instruction is executed, an operation exception is recognized.

Each of the vector instructions described herein has a plurality of fields, and one or more of the fields has a subscript number associated therewith. The subscript number associated with a field of the instruction denotes the operand to which the field applies. For instance, the subscript number 1 associated with vector register $V_1$ denotes that the register in $V_1$ includes the first operand, and so forth. A register operand is one register in length, which is, for instance, 128 bits.

Figure 8:
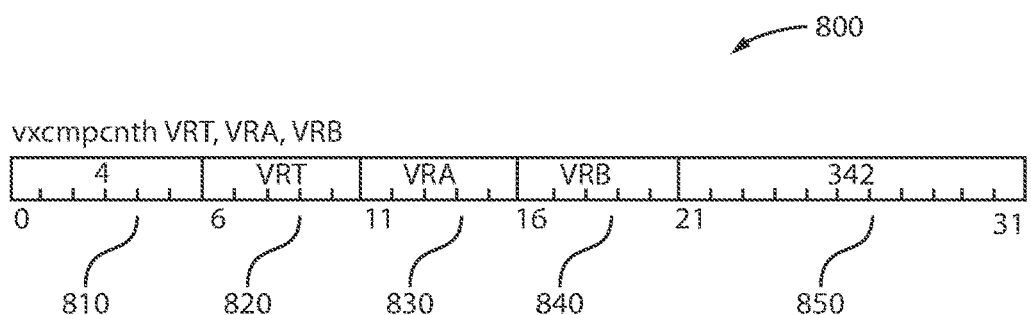
FIG. 8 depicts a format for a cross compare and count instruction, in accordance with an embodiment of the present principles.

FIG. 8 depicts a format for a cross compare and count instruction, in accordance with an embodiment of the present principles.

In one embodiment, the cross compare and count instruction 800 includes a first opcode field 810, a first vector register field 820 used to designate a first vector register ($V_{RT}$), a second vector register field 830 used to designate a second vector register ($V_{RA}$), a third vector register field 840 used to designate a third vector register ($V_{RB}$), and a second opcode field 850. Each of the fields 820, 830, 840, in one example, is separate and independent from the opcode field(s) 810, 850. Further, in one embodiment, the fields 820, 830, 840 are separate and independent from one another. However, in other embodiments, more than one field may be combined. In one example, selected bits (e.g., the first few bits) of the opcode designated by opcode field 810 may specify the length of the cross compare and count instruction 800. In this particular example, the selected bits indicate that the length is 4 halfwords. Further, the format of the cross compare and count instruction 800 may be a vector register with a register operation having an extended opcode field (not shown).

In one embodiment, the cross compare and count instruction 800 is a SIMD instruction. A SIMD instruction is an instruction that, when processed, causes a SIMD operation to be performed on multiple distinct data values instead of a single data value. A SIMD operation is implemented in hardware and may take one or more machine cycles to execute. One approach for implementing a SIMD operation is to use one or more registers that are each capable of storing multiple distinct data values. Such registers may be referred to as SIMD registers. For example, if a SIMD register is capable of storing 128 bits and data elements (e.g., integers) are 32 bits in size, then the SIMD register is capable of storing 128/32=4 distinct data elements.

In accordance with one or more aspects, the vector cross-compare and count instructions 800 are implemented with SIMD having fixed-size vectors with subword parallelism. Subword parallelism relates to the idea that if one has registers which may hold machine words of multiple times the data type size, then one may pack several data elements into them, and make single instructions affect all of those simultaneously. A 128-bit register, for instance, may hold two 64-bit floating point values, as long as the "multiply" instruction is aware that the register is split in the middle (e.g., to get 2 multiplications out of 1 operation).

Execution of the vector cross-compare and count instruction 800 enables the SIMD engine to count the number of data elements in a vector that satisfy a given condition. Additionally, execution of the vector cross-compare and count instruction 800 enables the SIMD engine to count the number of times a specified value occurs in a vector. In other words, for each fullword in one vector ($V_{RB}$), count the number of fullwords in the other vector ($V_{RA}$) that are equal to it. Stated differently, after comparing the contents of the two vectors $V_{RA}$, $V_{RB}$, for each fullword in vector $V_{RB}$, count the number of fullwords in vector $V_{RA}$ that are the same, and return the number of times that each fullword appears.

Moreover, execution of a vector cross-compare and equal instruction enables the SIMD engine to, for each fullword in one vector ($V_{RB}$), determine if it is equal to at least one fullword in another vector ($V_{RA}$). The vector cross-compare and equal instruction may be executed in tandem with the vector cross-compare and count instruction 800.

Figure 9:
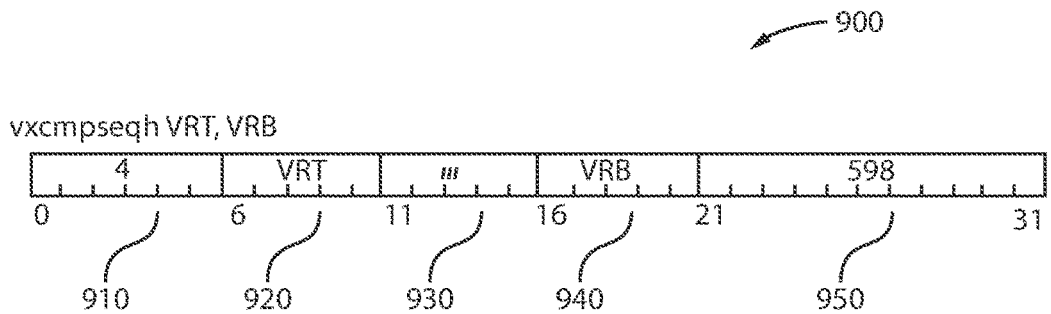
FIG. 9 depicts a format for a cross compare and sequence instruction, in accordance with an embodiment of the present principles.

FIG. 9 depicts a format for a cross compare and sequence instruction, in accordance with an embodiment of the present principles.

In one embodiment, the cross compare and sequence instruction 900 includes a first opcode field 910, a first vector register field 920 used to designate a first vector register ($V_{RT}$), other fields 930, a second vector register field 940 used to designate a second vector register ($V_{RB}$), and a second opcode field 950. Each of the fields 920, 940, in one example, is separate and independent from the opcode field(s) 910, 950. Further, in one embodiment, the fields 920, 940 are separate and independent from one another. However, in other embodiments, more than one field may be combined.

In one embodiment, the cross compare and sequence instruction 900 is a SIMD instruction. In accordance with one or more aspects, the vector cross-compare and sequence instructions 900 are implemented with SIMD having fixed size vectors with subword parallelism. Execution of the vector cross-compare and sequence instruction 900 enables the SIMD engine to generate sequence counts for sets of duplicated values in a vector. In other words, for each fullword in one vector ($V_{RB}$), count the rank of the fullword (i.e., count the number of repetitions starting from zero). Stated differently, after comparing the contents of the two vectors $V_{RA}$, $V_{RB}$, for each fullword in vector $V_{RB}$, count the number of times each fullword repeats in vector $V_{RA}$, and return the number of times that each fullword repeats in order of appearance.

It is noted that each instruction 800, 900 (and the vector cross-compare equal instruction) involves the comparison of every data element in one vector register with every data element in another vector register. The vector cross-compare equal instruction may be designated as (vxcmpeq). The vector cross-compare and count (and count equal) instruction 800 may be designated as (vxcmpcnt). The vector cross-compare and sequence instruction 900 may be designated as (vxcmpseq). For each vector instruction, for a SIMB with 32 byte vectors, there is 32 bytes or 16 halfwords or 8 fullwords or 4 doublewords. The implementation of these vector cross-compare instructions involves SIMD with fixed size vectors and subword parallelism.

FIG. 10 depicts example code for vectorizing histogram computations using vector cross-compare instructions, in accordance with an embodiment of the present principles.

The code 1000 provides an example for vectorizing histogram computations for one iteration. In this example, it takes seven (7) instructions to compute a histogram of eight (8) elements. In other words, ⅞ instructions per element, which translates to a throughput improvement of more than 8 times.

Thus, in one or more embodiments, a method for providing vector histogram calculation operations in SIMD operations in a computer system that executes on a vector of N elements for each SIMD instruction is presented. The histogram operation is calculated with SIMD parallelism using vector increment operations. Consequently, histogram calculations are vectorized using subword processing.

FIG. 11 depicts example code for vectorizing bucket hashing computations using vector cross-compare instructions, in accordance with an embodiment of the present principles.

The code 1100 provides an example for vectorizing bucket hashing computations for one iteration. In this example, it takes eight (8) instructions to compute a histogram of eight (8) elements. In other words, one instruction per element, which translates to a throughput improvement of more than 12 times.

In one or more embodiments, database operations, such as hash table join and hash table aggregation, involve a hash table. In an embodiment, the hash table is implemented as a packed bucket data structure where each bucket has a fixed length and may store multiple keys and corresponding data values. The size of a hash bucket may be equivalent to a cache line size. A cache line refers to a fixed size of blocks of data that is transferred between memory and cache. Alternatively, the size of a hash bucket may be determined based on the size of a SIMD register, which may or may not be the same as the cache line size. For example, if a SIMD register is 128 bits, then 128 bits (or a multiple thereof) may be chosen as the hash bucket size.

The vectorized cross-compare instructions used in FIGS. 10 and 11 may be different depending on the type of operation that is "vectorized." For example, in a hash table build of FIG. 11, one or more vectorized instructions may be used to determine whether a bucket in a hash table includes a free slot for inserting a key. As another example, in hash table probe, one or more vectorized instructions may be used to determine a position, within a bucket of a hash table, where a key is located. In another technique, one or more vectorized instructions may be used to identify a shuffle mask based on matching bits and update an output array based on the shuffle mask and an input array. These instructions may be used in tandem with the cross-compare and count instruction 800 and the cross-compare and sequence instruction 900, discussed above. Therefore, the instructions discussed herein may be used in combination with other instructions necessary to implement histogram computations, as well as hash bucketing computations.

Figure 12:
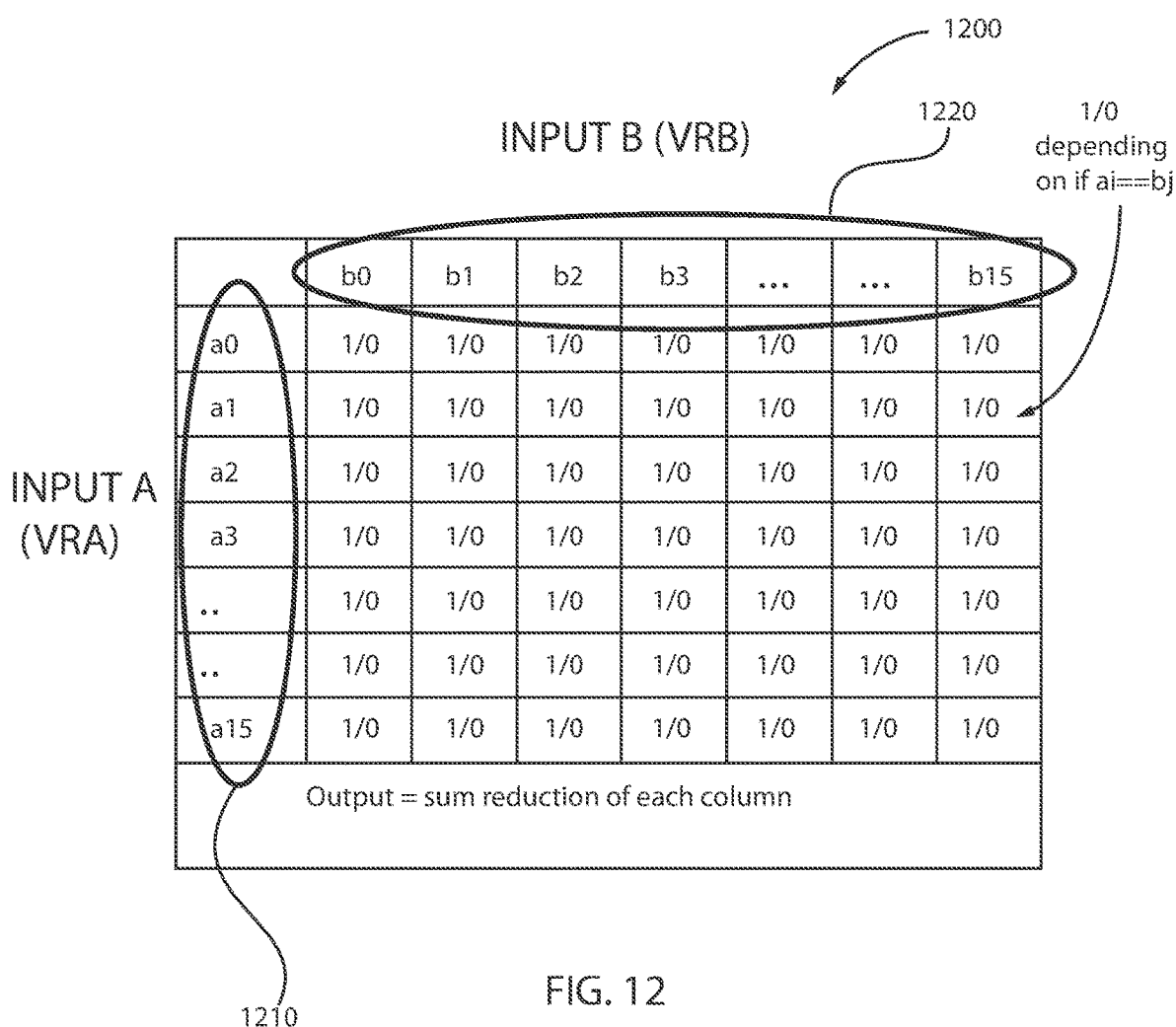
FIG. 12 depicts an implementation of a vector cross-compare and count instruction manipulating halfword data elements, in accordance with an embodiment of the present principles.

FIG. 12 depicts an implementation of a vector cross-compare and count instruction manipulating halfword data elements, in accordance with an embodiment of the present principles.

The implementation structure 1200 illustrates two vectors, a first vector 1210 and a second vector 1220. The first vector 1210 is depicted in the leftmost column of the matrix in a vertical direction and the second vector 1220 is depicted in the topmost row of the matrix in a horizontal direction. The first vector 1210 includes 16 halfwords and the second vector 1220 includes 16 halfwords. The data elements of the first vector 1210 are designated as a0-a15 and the data elements of the second vector 1220 are designated as b0-b15. The output register also contains 16 halfword data elements that represent the per-column sum reductions. In one example, if data element a3 is equal to data element b3, then the box representing the intersection of data elements a3, b3 is designated as "1/0." Thus, each of the data elements of vectors 1210 and 1220 are compared to each other to determine which data elements have equal values. When equal values are detected, a designation "1/0" is entered.

Figure 13:
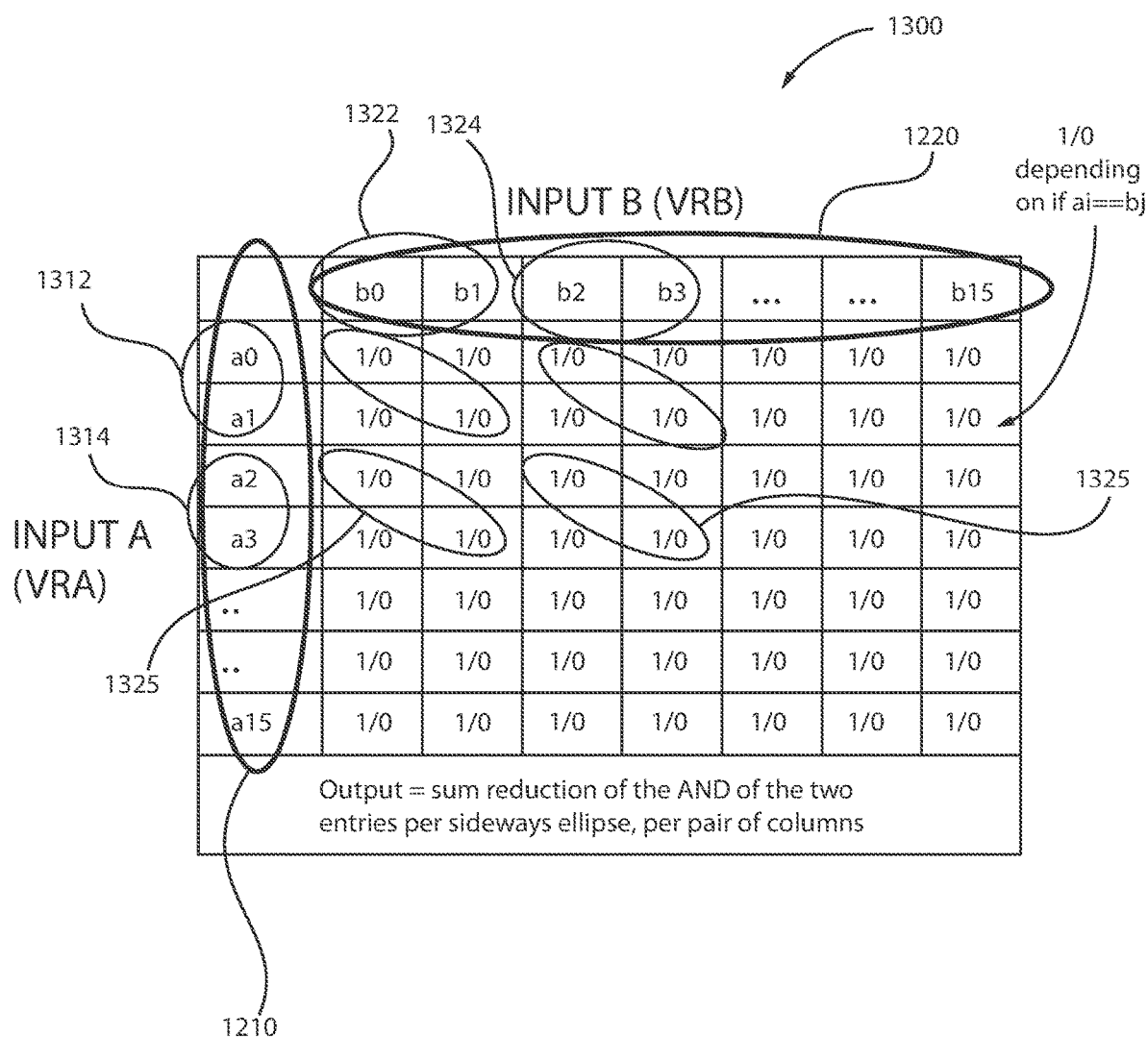
FIG. 13 depicts an implementation of a vector cross-compare and count instruction manipulating fullword data elements, in accordance with an embodiment of the present principles.

FIG. 13 depicts an implementation of a vector cross-compare and count instruction manipulating fullword data elements, in accordance with an embodiment of the present principles.

The implementation structure 1300 illustrates two vectors, a first vector 1210 and a second vector 1220. The first vector 1210 is depicted in the leftmost column of the matrix in a vertical direction and the second vector 1220 is depicted in the topmost row of the matrix in a horizontal direction. The first vector 1210 includes 16 halfwords or 8 fullwords and the second vector 1220 includes 16 halfwords or 8 fullwords. The data elements of the first vector 1210 are designated as a0-a15 and the data elements of the second vector 1220 are designated as b0-b15. The matrix depicts a first fullword 1312 and a second fullword 1314 of the first vector 1210. The matrix further depicts a first fullword 1322 and a second fullword 1324 of the second vector 1220. Each of the fullword data elements 1312, 1314 of the first vector 1210 may be referred to as a pair of halfwords. Similarly, each of the fullword data elements 1322, 1324 of the second vector 1220 may be referred to as a pair of halfwords, as indicated by elements 1325 in the matrix. The output register also contains 8 fullword data elements that represent the sum reductions as indicated per pair of columns. In other words, the output register is the sum reduction of the AND of the two entries shown in selection 1325, per pair of columns.

In one example, if data element a0 is equal to data element b0, and if data element a1 is equal to data element b1, then the boxes representing the intersection of such data elements a0, b0 and a1, b1 are designated as "1/0." Thus, each of the data elements of vectors 1210 and 1220 are compared to each other to determine which data elements have equal values. When equal values are detected, a designation "1/0" is entered. Additionally, since processing takes place with fullword data elements, cross-comparison of data elements between columns is also possible. Thus, data elements of different columns may be grouped together and data elements of different rows may be grouped together, as shown by the selections 1325.

It is noted that the comparator structure (FIG. 16) used for fullwords in FIG. 13 is the same as that used for halfwords in FIG. 12.

Figure 14:
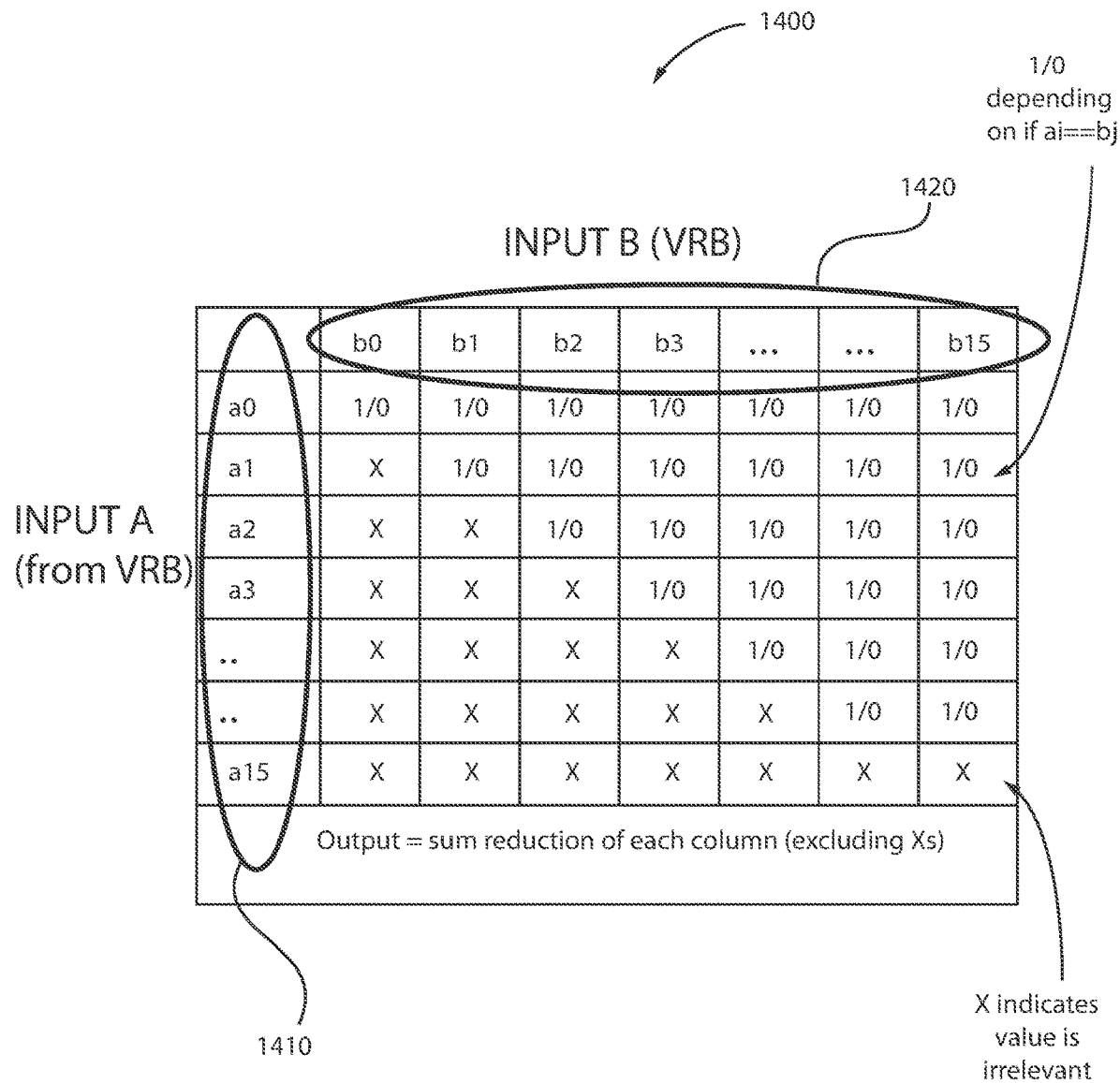
FIG. 14 depicts an implementation of a vector cross-compare and sequence instruction manipulating halfword data elements, in accordance with an embodiment of the present principles.

FIG. 14 depicts an implementation of a vector cross-compare and sequence instruction manipulating halfword data elements, in accordance with an embodiment of the present principles.

The implementation structure 1400 illustrates two vectors, a first vector 1410 and a second vector 1420. The first vector 1410 is depicted in the leftmost column of the matrix in a vertical direction and the second vector 1420 is depicted in the topmost row of the matrix in a horizontal direction. The first vector 1410 includes 16 halfwords and the second vector 1420 includes 16 halfwords. The data elements of the first vector 1410 are designated as a0-a15 and the data elements of the second vector 1420 are designated as b0-b15. The output register also contains 16 halfword data elements that represent the per-column sum reductions. In one example, if data element a0 is equal to data element b3, then the box representing the intersection of data elements a0, b3 is designated as "1/0." Thus, each of the data elements of vectors 1410 and 1420 are compared to each other to determine which data elements have equal values. When equal values are detected, a designation "1/0" is entered. However, if the data values are not equal, then an "X" is entered into the appropriate box. For example, data element a3 is not the same as data element b2, and the box representing the intersection of data elements a3, b2 is designated as "X." Therefore, sequence counts may be generated for sets of duplicated values in a vector.

Figure 15:
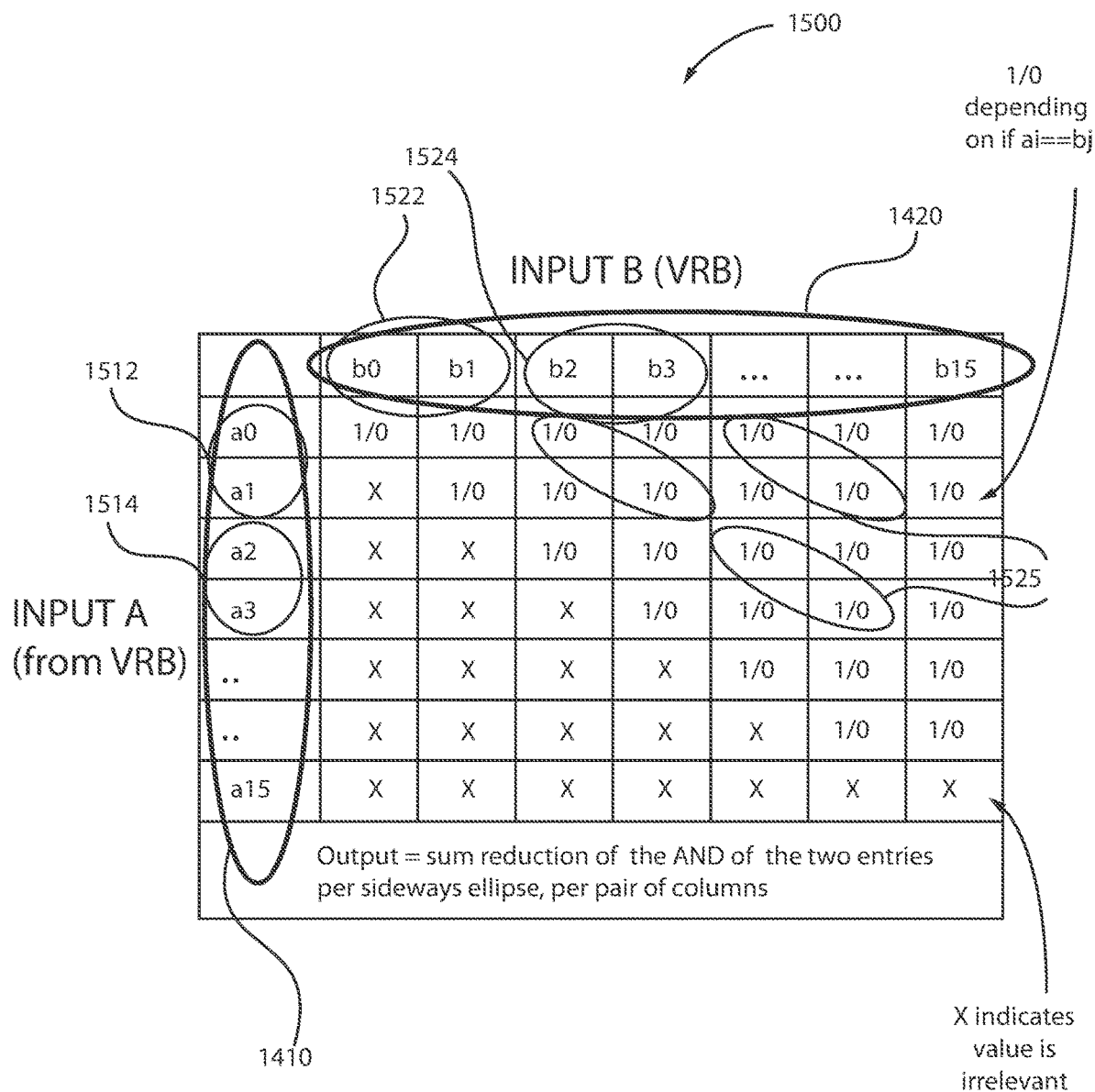
FIG. 15 depicts an implementation of a vector cross-compare and sequence instruction manipulating fullword data elements, in accordance with an embodiment of the present principles.

FIG. 15 depicts an implementation of a vector cross-compare and sequence instruction manipulating fullword data elements, in accordance with an embodiment of the present principles.

The implementation structure 1500 illustrates two vectors, a first vector 1410 and a second vector 1420. The first vector 1410 is depicted in the leftmost column of the matrix in a vertical direction and the second vector 1420 is depicted in the topmost row of the matrix in a horizontal direction. The first vector 1410 includes 16 halfwords or 8 fullwords and the second vector 1420 includes 16 halfwords or 8 fullwords. The data elements of the first vector 1410 are designated as a0-a15 and the data elements of the second vector 1420 are designated as b0-b15. The matrix depicts a first fullword 1512 and a second fullword 1514 of the first vector 1410. The matrix further depicts a first fullword 1522 and a second fullword 1524 of the second vector 1420. Each of the fullword data elements 1512, 1514 of the first vector 1410 may be referred to as a pair of halfwords. Similarly, each of the fullword data elements 1522, 1524 of the second vector 1420 may be referred to as a pair of halfwords, as indicated by elements 1525 in the matrix. The output register also contains 8 fullword data elements that represent the sum reductions as indicated per pair of columns. In other words, the output register is the sum reduction of the AND of the two entries shown in selection 1525, per pair of columns.

In one example, if data element a0 is equal to data element b2, and if data element a1 is equal to data element b3, then the boxes representing the intersection of such data elements a0, b2 and a1, b3 are designated as "1/0." Thus, each of the data elements of vectors 1410 and 1420 are compared to each other to determine which data elements have equal values. When equal values are detected, a designation "1/0" is entered. Additionally, since processing takes place with fullword data elements, cross-comparison of data elements between columns is also possible. Thus, data elements of different columns may be grouped together and data elements of different rows may be grouped together, as shown by the selections 1525. Moreover, if the data values are not equal, then an "X" is entered into the appropriate box. For example, data element a3 is not the same as data element b2, and the box representing the intersection of data elements a3, b2 is designated as "X." Therefore, sequence counts may be generated for sets of duplicated values in a vector.

It is noted that the comparator structure (FIG. 16) used for fullwords in FIG. 15 is the same as that used for halfwords in FIG. 14.

Additionally, with reference to FIGS. 12-15, it is noted that in terms of implementation structure, the cross-compare equal instructions are identical to the cross-compare and count equal instructions, except that the sum reductions (per column or column-pair) are replaced by OR reductions.

Figure 16:
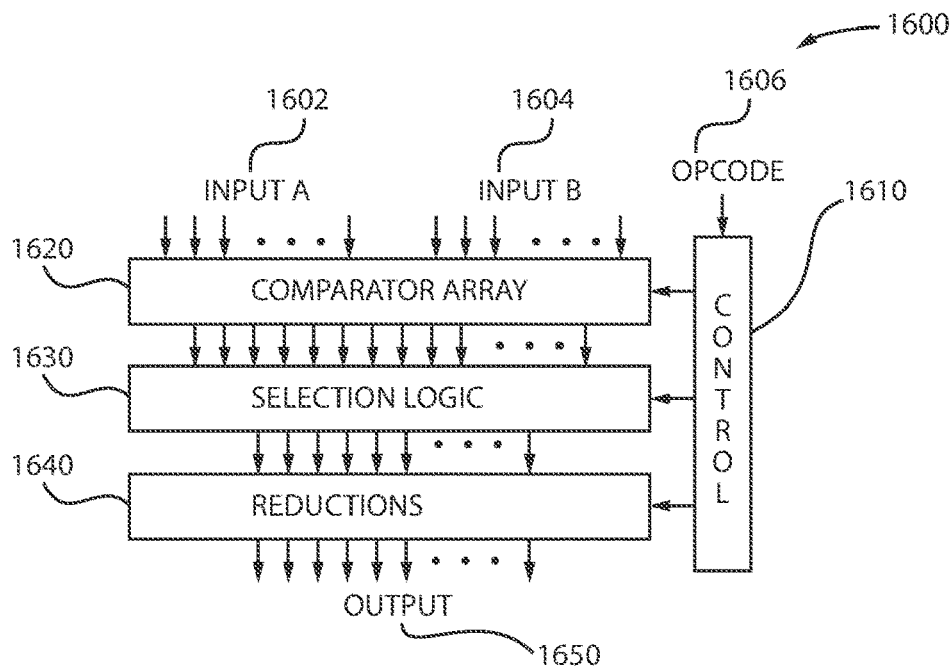
FIG. 16 is a block/flow diagram of a system implementing vector cross-compare instructions, in accordance with an embodiment of the present principles.

FIG. 16 is a block/flow diagram of a system implementing vector cross-compare instructions, in accordance with an embodiment of the present principles.

The system 1600 includes an opcode 1606 for controlling the controller 1610. The opcode 1606 specifies which vector instructions to be executed. The first vector may be input A or input 1602 and the second vector may be input B or input 1604. The first vector may be, for example, the cross-compare and count vector, whereas the second vector may be, for example, the cross-compare and sequence vector. The controller 1610 controls the comparator array 1620, the selection logic 1630, and the reductions block 1640. The selection logic 1630 implements ANDs of comparator outputs of the comparator array 1620. The selection logic 1630 may then select a subset to be passed to the reduction block 1640. The reduction block 1640 generates the output 1650.

Therefore, FIGS. 12-15 illustrate how the system 1600 is used to support the three classes of instructions, each for different size data elements.

Figure 17:
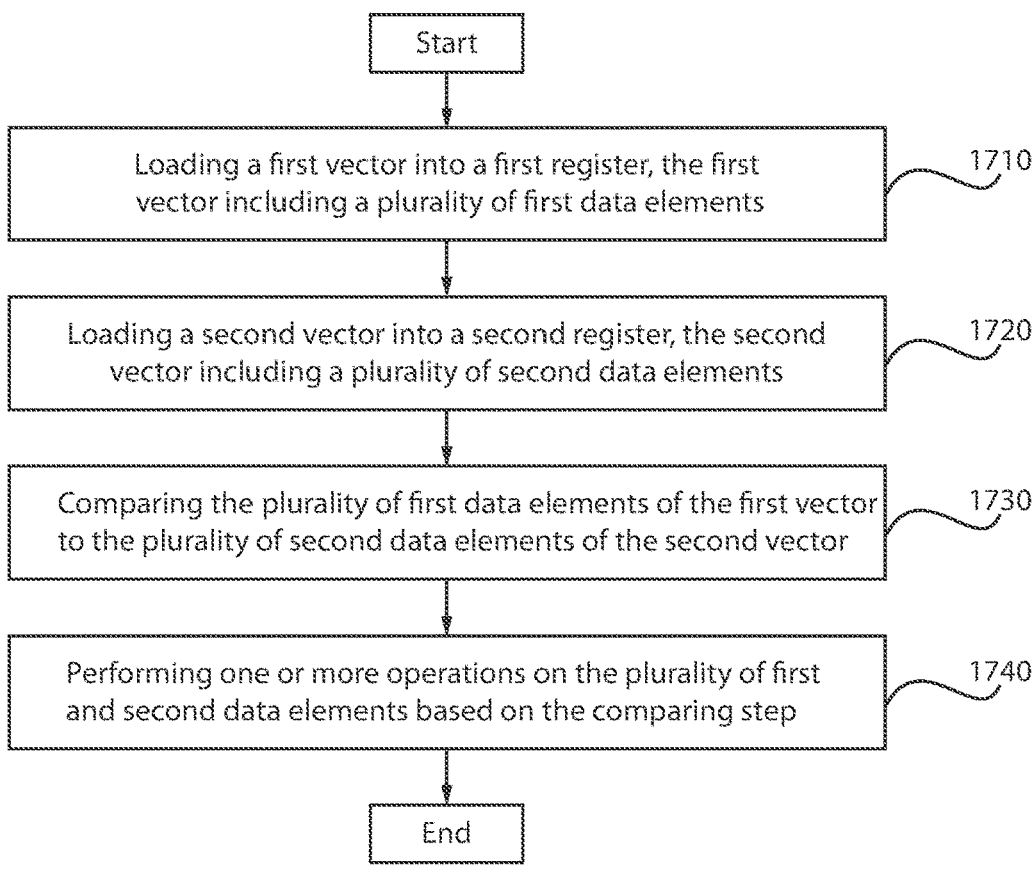
FIG. 17 is a block/flow diagram of an exemplary method for implementing vector cross-compare instructions, in accordance with an embodiment of the present principles.

FIG. 17 is a block/flow diagram of an exemplary method for implementing vector cross-compare instructions, in accordance with an embodiment of the present principles.

At block 1710, a first vector is loaded into a first register, the first vector including a plurality of first data elements.

At block 1720, a second vector is loaded into a second register, the second vector including a plurality of second data elements.

At block 1730, the plurality of first data elements of the first vector are compared to the plurality of second data elements of the second vector.

At block 1740, one or more operations are performed on the plurality of first and second data elements based on the comparing block and based on at least one vector cross-compare instruction.

Any of the components of the present invention could be created, integrated, hosted, maintained, deployed, managed, serviced, etc. by a service supplier who offers to provide a method for executing machine instructions with respect to a product or service. Thus the present invention discloses a process for deploying, creating, integrating, hosting, maintaining, and/or integrating computing infrastructure, including integrating computer-readable code into the computer systems 100, 200, 300 (FIGS. 1, 2, and 3), wherein the code in combination with the computer systems 100, 200, 300 are capable of performing a method for executing vector cross-compare instructions with respect to a product or service. In another embodiment, the invention provides a business method that performs the process steps/blocks of the invention on a subscription, advertising, and/or fee basis. That is, a service supplier, such as a Solution Integrator, could offer to provide a method for executing machine instructions with respect to a product or service. In this case, the service supplier can create, maintain, support, etc. a computer infrastructure that performs the process steps/blocks of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for executing a Single Instruction, Multiple Data (SIMD) instruction on a processor, the method comprising:
   loading a first vector into a first location, the first vector including a plurality of first data elements;
   loading a second vector into a second location, the second vector including a plurality of second data elements;
   comparing the plurality of first data elements of the first vector to the plurality of second data elements of the second vector; and
   performing one or more operations on the plurality of first and second data elements by applying a plurality of different vector cross-compare instructions where all vector comparisons are completed before performing all selections.

2. The method of claim 1, wherein the plurality of different vector cross-compare instructions are processed by partitioning the plurality of different vector cross-compare instructions into comparison, selection, and reduction steps.

3. The method of claim 2, wherein the partitioning of the plurality of different vector cross-compare instructions into the comparison, selection, and reduction steps occurs via a common partitioning implementation structure.

4. The method of claim 3, wherein all selections are completed before performing all reductions.

5. The method of claim 4, further comprising counting a number of data elements of the plurality of first and second data elements that satisfy at least one condition.

6. The method of claim 5, further comprising counting a number of times specified values occur in the plurality of first and second data elements.

7. The method of claim 6, further comprising generating sequence counts for duplicated values identified in the plurality of first and second data elements.

8. The method of claim 1, wherein one of the vector cross-compare instructions is a vector cross-compare and count instruction.

9. The method of claim 1, wherein one of the vector cross-compare instructions is a vector cross-compare and sequence instruction.

10. The method of claim 1, wherein one of the vector cross-compare instructions is a vector cross-compare equal instruction.

11. The method of claim 1, further comprising determining whether each fullword of the second vector is equal to at least one fullword of the first vector.

12. The method of claim 1, further comprising counting a number of fullwords in the first vector equal to each fullword in the second vector.

13. The method of claim 1, further comprising counting a rank of a word for each fullword in the second vector.

14. A computer system for executing a Single Instruction, Multiple Data (SIMD) machine instruction in a central processing unit, the computer system comprising:
   a memory; and
   a processor in communications with the memory, wherein the computer system is configured to perform the steps of:
      loading a first vector into a first location, the first vector including a plurality of first data elements;
      loading a second vector into a second location, the second vector including a plurality of second data elements;
      comparing the plurality of first data elements of the first vector to the plurality of second data elements of the second vector; and
      performing one or more operations on the plurality of first and second data elements by applying a plurality of different vector cross-compare instructions where all vector comparisons are completed before performing all selections.

15. The computer system of claim 14, wherein the plurality of different vector cross-compare instructions are processed by partitioning the plurality of different vector cross-compare instructions into comparison, selection, and reduction steps.

16. The computer system of claim 15, wherein the partitioning of the plurality of different vector cross-compare instructions into the comparison, selection, and reduction steps occurs via a common partitioning implementation structure.

17. The computer system of claim 16, wherein all selections are completed before performing all reductions.

18. The computer system of claim 17, wherein the one or more operations include counting a number of data elements of the plurality of first and second data elements that satisfy at least one condition.

19. The computer system of claim 18,
   wherein the one or more operations include counting a number of times specified values occur in the plurality of first and second data elements; and
   wherein the one or more operations include generating sequence counts for duplicated values identified in the plurality of first and second data elements.

20. A non-transitory computer readable storage medium comprising a computer readable program for executing a Single Instruction, Multiple Data (SIMD) instruction on a processor, wherein the computer readable program when executed on a computer causes the computer to perform the steps of:
  loading a first vector into a first location, the first vector including a plurality of first data elements;
  loading a second vector into a second location, the second vector including a plurality of second data elements;
  comparing the plurality of first data elements of the first vector to the plurality of data elements of the second vector; and
  performing one or more operations on the plurality of first and second data elements by applying a plurality of different vector cross-compare instructions where all vector comparisons are completed before performing all selections.

* * * * *